United States Patent
Reid

(10) Patent No.: US 7,011,757 B1
(45) Date of Patent: Mar. 14, 2006

(54) PROCESS FOR RECYCLING MIXED LIQUOR WITH DUAL-USE JET RECIRCULATION PUMPS TO PROVIDE HIGHLY EFFICIENT WASTEWATER TREATMENT

(76) Inventor: John H. Reid, 6 River Oak Pl., Fredericksburg, VA (US) 22407

( * ) Notice: Subject to any disclaimer, the term of this patent is extended or adjusted under 35 U.S.C. 154(b) by 31 days.

(21) Appl. No.: 10/770,427

(22) Filed: Feb. 4, 2004

(51) Int. Cl.
*C02F 3/30* (2006.01)

(52) U.S. Cl. ............... 210/605; 210/621; 210/629; 210/903; 210/906

(58) Field of Classification Search ............... 210/194, 210/195.1, 258, 416.1, 605, 621, 630, 903, 210/906, 629; 417/503
See application file for complete search history.

(56) References Cited

U.S. PATENT DOCUMENTS

| | | | | | |
|---|---|---|---|---|---|
| 2,238,597 | A | * | 4/1941 | Page | 210/121 |
| 3,276,994 | A | * | 10/1966 | Andrews | 210/622 |
| 3,772,187 | A | * | 11/1973 | Othmer | 210/622 |
| 4,284,508 | A | * | 8/1981 | Jewell | 210/603 |
| 4,767,537 | A | * | 8/1988 | Davis | 210/608 |
| 4,832,848 | A | * | 5/1989 | Velebil et al. | 210/617 |
| 4,867,883 | A | | 9/1989 | Daigger et al. | |
| 4,954,257 | A | * | 9/1990 | Vogelpohl et al. | 210/607 |
| 5,603,833 | A | | 2/1997 | Miller | |
| 5,653,876 | A | * | 8/1997 | Funke | 210/198.2 |
| 5,772,886 | A | * | 6/1998 | Bettle | 210/605 |
| 5,833,857 | A | * | 11/1998 | Roth | 210/610 |
| 6,096,214 | A | * | 8/2000 | Ripley | 210/603 |
| 6,312,599 | B1 | | 11/2001 | Reid | |
| 2002/0074286 | A1 | * | 6/2002 | Nasr et al. | 210/605 |
| 2003/0192827 | A1 | * | 10/2003 | McDowell et al. | 210/623 |

* cited by examiner

*Primary Examiner*—Fred G. Prince

(57) ABSTRACT

A process that removes nitrogen by the MLE Process or nitrogen and phosphorus by the Bio-P Process from municipal or industrial wastewaters by combining at least one dual-use jet recirculation pump with jet manifolds disposed at the bottoms of deep tanks functioning as Reactors to withdraw mixed liquor from a flow-connected tank and mixed liquor from a downstream tank in selected amounts, both mixed liquors being pumped to the jet manifold within the flow-connected tank that mixes the contents of the tank, whereby higher operating costs for electric power and higher capital costs for larger pumps and piping are avoided.

20 Claims, 3 Drawing Sheets

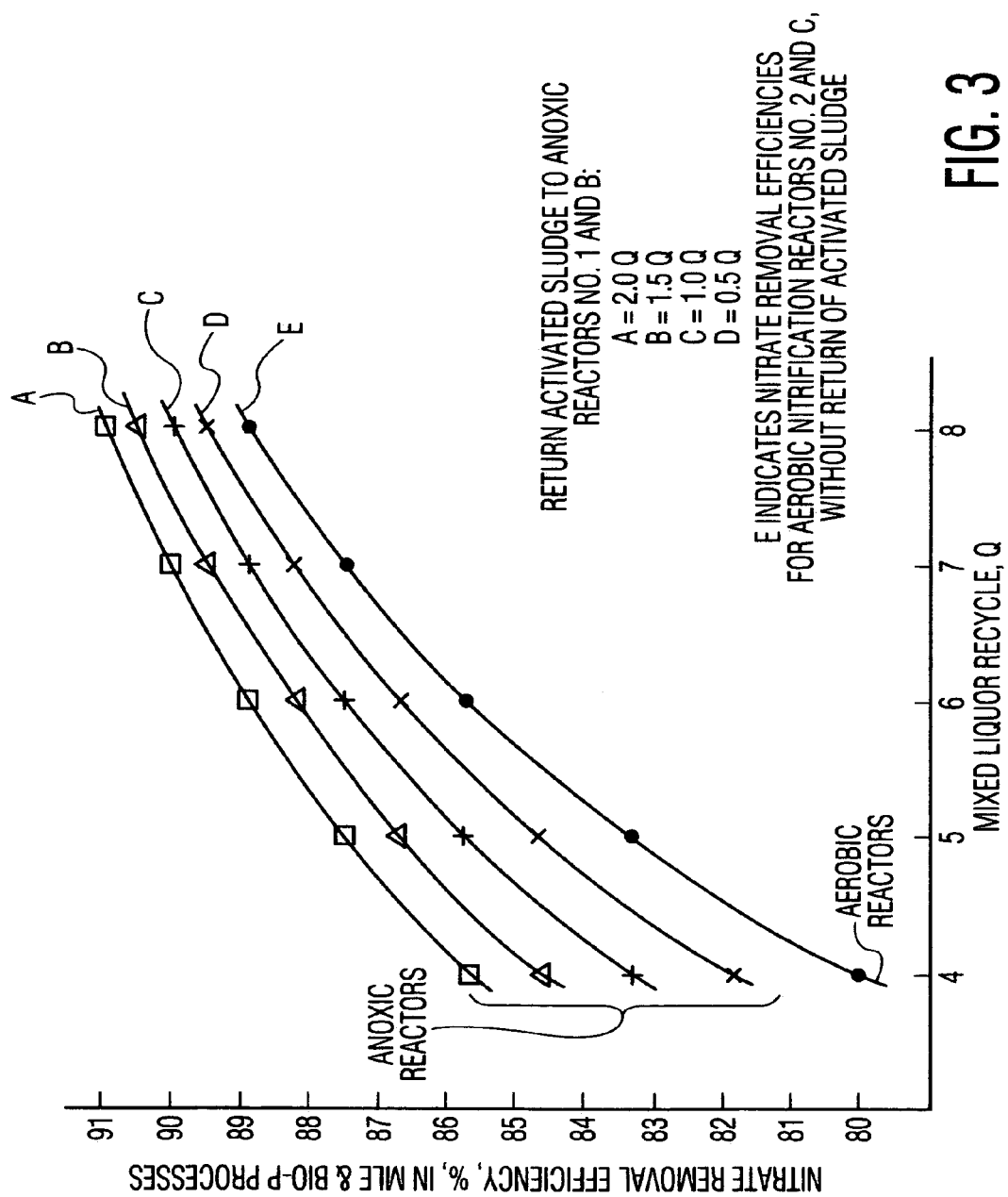

PROCESS FOR RECYCLING MIXED LIQUOR WITH DUAL-USE JET RECIRCULATION PUMPS TO PROVIDE HIGHLY EFFICIENT WASTEWATER TREATMENT

FIELD OF THE INVENTION

This invention relates to treatment of wastewater produced by municipal or industrial operations. It specifically relates to dual use of jet recirculation pumps to provide both backward recycling of 100% or up to 1100% of the throughput wastewater rate and supplying mixed liquor for jet manifolds that mix the contents of deep tanks. This invention is suitable for both the two-stage MLE process and the three-stage Bio-P process.

BACKGROUND OF THE INVENTION

The MLE (Modified Ludzak Ettenger) Process is often used to achieve biological nitrogen removal when treating municipal or industrial wastewaters. This MLE process is a two-stage activated sludge process in which the first-stage activated sludge reactor is operated as an Anoxic Carbonaceous Removal/Denitrification (low D.O.=0 to 0.5 mg/L) Reactor and is followed by a second-stage Aerobic Nitrification (high D.O.=1 to 3 mg/L) Reactor.

In order to achieve the desired treatment results, the first-stage Anoxic Reactor must be completely mixed in order to ensure the proper suspension of mixed liquor biological solids within the reactor. Such desirable mixing in the first-stage reactor can be provided by an assortment of mixing apparatuses, such as jet manifolds, floating or fixed mixers, side-entering mixers, and recirculation pumps. Jet manifolds are very effective and economical when disposed at the bottoms of deep tank reactors.

However, this economical use requires the combined operation of a jet recirculation pump and a jet manifold. Such a combination is typically designed to remove a flow of mixed liquor by suction from the anoxic reactor at one location and then to pump the flow back into the anoxic reactor through the jet manifold at another location for dispersion of the flow and of the jet mixing energy within the tank bottom.

Jet recirculation pumps are typically sized by jet equipment manufacturers to provide a very high flow recirculation rate from the tank being mixed back into the same tank being mixed. Typically this jet recirculation pumping rate is much greater than 400% of the throughput flow of the wastewater treatment process.

The MLE Process utilizes a first-stage Anoxic Reactor, which receives the incoming wastewater, and a second-stage Aerobic Reactor which receives ammonia-rich wastewater from the Anoxic Reactor and recycles a portion of its nitrate-rich mixed liquor to the Anoxic Reactor and the remainder to the Clarifier.

The first-stage Anoxic Reactor in the MLE Process provides activated sludge treatment for a dual purpose: 1) to remove carbonaceous BOD by biological synthesis of the incoming wastewater and 2) to denitrify nitrate ions which have been recycled from the second-stage Aerobic Nitrification Reactor. When the nitrate ions are denitrified, oxygen is released and is immediately utilized by the bacteria for synthesis of carbonaceous BOD in the wastewater and for endogenous respiration of biomass in the mixed liquor. Anoxic carbonaceous removal of BOD in the Anoxic Reactor results in the production of ammonia from proteins carried by the incoming wastewater.

Such reactions are known in the art and are illustrated in FIG. 2 of U.S. Pat. No. 6,312,599 B1, issued to John H. Reid. This ammonia, dissolved in the wastewater flowing from the first-stage Anoxic Reactor, is biologically oxidized in the second-stage Aerobic Nitrification Reactor which converts ammonia to nitrite ions and then to nitrate ions in its mixed liquor.

A selected portion of the nitrate ions produced in the second-stage Aerobic Nitrification Reactor is in the mixed liquor which is recycled, according to the MLE process, back to the first-stage Anoxic Reactor in order to serve as an oxygen source for carbonaceous BOD removal in the Anoxic Reactor. This recycling is done by recirculating mixed liquor from the Aerobic Reactor back to the Anoxic Reactor, either by pumping or by gravity flow, depending on the relative elevations of the operating liquid surfaces in the first-stage and second-stage reactors.

The nitrate recycle rate used in the MLE process is typically equal to 200% to more than 400% of the throughput wastewater flow rate. For example, if a thoughput wastewater flow rate and volume of 1.0 million gallons per day (MGD) is required in an MLE process, then the nitrate recycle rate from the second-stage Aerobic Nitrification Reactor (hereinafter Reactor No. 2) back to the first-stage Anoxic Reactor (hereinafter Reactor No. 1), equals 2.0 to more than 4.0 MGD. If a nitrate recycle rate of 200% is used in an MLE process, then approximately 50% of the nitrate nitrogen produced in Reactor No. 2 is recycled back to Reactor No. 1 for removal by biological denitrification.

If a nitrate recycle rate equal to 400% is used in an MLE process, then approximately 67% of the nitrate produced in Reactor N. 2 is recycled back to Reactor No. 1 for removal by biological denitrification. Consequently, as the nitrate recycle rate from Reactor No. 2 back to Reactor No. 1 is increased, the nitrate removal efficiency of the MLE process is also increased.

Unfortunately, the use of a higher nitrate recycle flow rate requires the use of larger nitrate recycle pumps, thereby necessitating greater capital costs for larger pumps and piping and greater operating costs for pumping power.

There is accordingly a need for a more efficient means of transferring large volumes of mixed liquor from one reactor, in the form of a deep tank, for example, to another reactor.

The same need exists in the biological phosphorous (Bio-P) removal process. This biological phosphorous process uses at least three activated-sludge reactors operating in series.

The first-stage reactor is an Anaerobic Reactor, operated with very low nitrate and zero D.O. concentration, that receives both the incoming wastewater and anoxic mixed liquor recycle flow from the second-stage Anoxic Reactor, operated at a very low D.O. concentration, that receives mixed liquor recycle from the downstream third-stage Aerobic Nitrification Reactor. The second-stage and the third-stage reactors of this three-stage process operate in the same manner as the first-stage and the second-stage reactors previously described in the MLE process.

A novel example of the Bio-P process is provided in U.S. Pat. No. 6,312,599 B1 of John H. Reid, wherein flow equalization basins or lagoons are utilized to perform the functions of anaerobic and anoxic tanks.

SUMMARY OF THE INVENTION

The object of this invention is to reduce the capital and operating costs in a high-efficiency MLE process and in a high-efficiency Bio-P process.

An additional object is to avoid the use of separate pumps for transferring large volumes of mixed liquor from one reactor to another reactor, especially when such reactors are disposed in deep tanks.

In accordance with these objects and the principles of this invention, a method is provided whereby a higher nitrate recycle rate than is typically used is available for either an MLE process or a Bio-P process without incurring higher operating costs for electric power and higher capital costs for larger pumps and piping by utilizing at least one jet recirculation pump having dual-use inflows for wastewater treatment. Each of the dual-use inflows is controllable, and each of the dual-use inflows is capable of being monitored as to the amount thereof.

This MLE wastewater treatment process for deep tanks operated in a series that includes an initial tank containing mixed liquor which receives a stream of throughput wastewater flowing at an input rate and a downstream tank which discharges into a clarifier, comprises the dual use of a jet recirculation pump, which is flow connected to the initial tank and to the downstream tank, to provide selectively both:

A) backward recycling of 100% or more of the input rate from the downstream tank to a jet manifold, disposed within the initial tank, that mixes the contents of the initial tank; and B) pumping the mixed liquor from the initial tank to the same jet manifold for increasing the mixing efficiency.

The jet recirculation pump attached to Reactor No. 1 removes suction flow from either Reactor No. 1 or from Reactor No. 2. By drawing suction flow from both Reactor No. 1 and Reactor No. 2, the jet recirculation pump can not only provide recirculated mixed liquor from Reactor No. 1 for improved mixing in Reactor No. 1 but can also provide nitrate recycle flow from Reactor No. 2 back into Reactor No. 1. Because the dual-use jet recirculation pump attached to Reactor No. 1 for mixing its contents typically utilizes a flow rate greater than 400% of the throughput wastewater flow rate, this pump can transfer all of the suction flow from Reactor No. 2 to the jet manifold in Reactor No. 1 that is needed to provide the required nitrate recycle flow from Reactor No. 2 back to Reactor No. 1 but can also remove an additional amount of recirculated liquor from Reactor No. 1 for feeding to the same jet manifold so that its mixing energy will be fully utilized. Deep tanks typically have depths of 24 to 32 feet.

The suction line used for the jet recirculation pump attached to Reactor No. 1 preferably has dual-suction capabilities. Specifically, this suction line can be connected to both reactors, with a valve controlling the flow rate from each reactor to the pump and with a flow meter on the portions of the suction line adjacent each reactor. Both the nitrate recycle flow from Reactor No. 2 to Reactor No. 1 and the recirculated liquor from Reactor No. 1 back to Reactor No. 1 can thereby be metered and controlled for the MLE Process.

The Bio-P Process requires the use of a first-stage Anaerobic Reactor (hereinafter Reactor A) in order to achieve enhanced biological phosphorous removal in the overall three-stage activated sludge process. The Bio-P process also requires recycling of anoxic mixed liquor from the second-stage Anoxic Reactor (hereinafter Reactor B) back to Reactor A. The anoxic mixed liquor recycle rate, typically used for transfer from Anoxic Reactor B back to Anaerobic Reactor A, is approximately 100% to more than 200% of the input wastewater flow rate. However, the nitrate mixed liquor recycle flow rate from the Aerobic Nitrification Reactor (hereinafter Reactor C) back to Anoxic Reactor B is 400% to more than 800% of the input wastewater flow rate.

In Reactor A, which must be adequately mixed, a population of excess phosphorus-storing (polyp) bacteria, such as acinetobacter and other phosphate-accumulating microorganisms that are able to store high amounts of phosphate, are present in the Bio-P process. This stored phosphate may be up to 10% by weight as polyphosphate inside the cells. In addition, a suitable substrate, such as soluble carbonaceous Chemical Oxygen Demand (COD) and Biological Oxygen Demand (BOD), in the form of volatile acids, must be present. The 7.3 kcal/mol of energy per mol of adenosine triphosphate (ATP) that is liberated by the hydrolysis of ATP by the polyp bacteria become available to the polyp cells, releasing phosphate and forming adenosine diphosphate, ADP. The polyP bacteria use this released energy to polymerize a substrate of organic compounds, such as acetic acid, propionic acid, and other short-chain volatile fatty acids (VFAs), as well as short-chain alcohols, for intracellular storage as polymerized compounds, such as poly-$\beta$-hydroxybutyrate (PHB) or poly-$\beta$-hydroxyvalerate (PHV).

However, other forms of BOD, such as proteins, cannot be used by the polyP bacteria. Nevertheless, during passage through Reactor A, a portion of these proteins are gradually broken down by other forms of bacteria into VFAs that gradually become available to the polyp bacteria. This anaerobic breakdown of organic compounds, by enzymes or microorganisms, to simpler products is termed fermentation. The polyP bacteria actually intercept the breakdown of such organic compounds that would otherwise eventually produce $CO_2$ and water. Such fermentation and deamination are illustrated in FIG. 2 of U.S. Pat. No. 6,312,699 B1, issued to John H. Reid.

Because the polyp bacteria have no electron acceptors available in Anaerobic Reactor A, they cannot produce new cellular material and multiply in Reactor A, but they can remove certain available organics from solution and sequester them for later utilization in subsequent Aerobic Reactor C where electron acceptors are available. In this Aerobic Reactor C, the polyp bacteria have the first opportunity to utilize the stored BOD products so that they have a competitive advantage over the non-polyP bacteria. Thus they proliferate at a higher rate in Reactor C and dominate the activated sludge bacterial population that includes autotrophic nitrifiers using ammonia as their energy source for converting ammonia to nitrite and nitrate ions.

When the polyP bacteria enter Aerobic Nitrification Reactor C, they metabolize the stored intracellular compounds for growth and energy. Because excess energy is generated beyond the needs for growth, the polyP bacteria, now much more abundant because of their growth, remove phosphate from solution and store the energy in intracellular phosphate bonds during a "luxury" uptake stage, whereby large quantities of phosphorus are removed from the system in the portion of the sludge that is wasted after clarification. This Biological Phosphorus Removal (BPR) activity is desirable, but nitrification and de-nitrification are also needed.

The key factor that determines the amount of phosphorus stored in the activated sludge is the amount of readily available organic matter in Anaerobic Reactor A and the absence of electron acceptors therein such as oxygen, nitrite, and nitrate. The bacteria will preferentially metabolize the organic matter rather than store it if electron acceptors, i.e., dissolved oxygen or oxygen from nitrates and nitrites, are available. Some such electron acceptors are always present in the inflowing wastewater. That is the situation in Anoxic Reactor No. 1 of the modified MLE process described earlier, plus the additional oxygen from recycled nitrates and nitrites.

In Anaerobic Reactor A, there must consequently be a large excess of organic matter beyond that needed to deplete the electron acceptors recycled or entrained into Reactor A. In other words, the quantity of stored substrate, in the form of organic matter and subsequently in the form of biologically removed phosphorus, will be reduced by the quantity of electron acceptors present in Reactor A.

In this three-stage activated sludge process, the anoxic recycle rate from Reactor B back to Reactor A and the nitrate recycle rate from Reactor C back to Reactor B can be achieved by the use of dual-use jet recirculation pumps as previously described for the two-stage MLE process. In this three-stage Bio-P process, the suction flow from second-stage Anoxic Reactor B is pumped back to first-stage Anaerobic Reactor A by the jet recirculation pump which is flow-connected to the jet manifold within Reactor A. This flow can also be controlled and metered to provide the desired low D.O and nitrate-poor recycle rate from Reactor B back to Reactor A.

Any additional recirculation flow required to provide complete mixing in Anaerobic Reactor A can be provided by the second suction line for the same jet recirculation pump which is connected to the jet manifold within Reactor A. Similarly, the dual-use jet recirculation pump used to provide complete mixing in Anoxic Reactor B can be operated to distribute suction flow from the third-stage Aerobic Nitrification Reactor C to the jet manifold within Reactor B as a nitrate-rich recycle flow and/or to pump mixed liquor from second-stage Anoxic Reactor B to the jet manifold within Anoxic Reactor B.

This three-stage activated sludge process, employing dual-use jet recirculation pumps to provide complete mixing in the anaerobic first-stage and the anoxic second-stage Reactors A and B, respectively, and also using the same jet recirculation pumps to provide anoxic recycle from Reactor B back to Reactor A and nitrate recycle from Reactor C back to Reactor B, results in considerable capital and operating cost savings by eliminating two or more large mixed liquor recirculation pumps.

The first-stage Anaerobic Reactor A is operated at low nitrate and very low or zero D.O. concentration. The second-stage Anoxic Denitrification Reactor B is operated at a very low D.O. concentration. The third-stage Aerobic Nitrification Reactor C is operated at above 1.0 mg/L of dissolved oxygen.

Anoxic mixed liquor is recycled from the second-stage Anoxic Reactor B back to the first-stage Anaerobic Reactor A. Aerobic mixed liquor is also recycled back to the second-stage Anoxic Denitrification Reactor B from the downstream third-stage Aerobic Nitrification Reactor C.

The second and third-stage reactors of this three-stage process are operated in the same way as the first and second-stage reactors previously described for the MLE process. To operate the reactors in accordance with the Bio-P process, however, the use of first-stage Anaerobic Reactor A is required in order to achieve enhanced biological phosphorous removal in the overall three-stage activated sludge process. Moreover, anoxic mixed liquor recycle is required from second-stage Anoxic Reactor B back to first-stage Anaerobic Reactor A.

The first-stage Anaerobic Reactor A is maintained under very low nitrate and zero Dissolved Oxygen (D.O). concentration in order to enable the polyp bacteria therein to hydrolyze adenosine triphosphate (ATP) while polymerizing Volatile Fatty Acids (VFAS) to form a substrate of organic compounds for intracellular storage and release of phosphate ions.

The second-stage Anoxic Reactor B is maintained under very low D.O. concentration in order to enable nitrates and nitrites in its nitrified mixed liquor to be reduced and thereby release nitrogen gas while forming denitrified mixed liquor.

The third-stage Aerobic Nitrification Reactor C is maintained under aerobic conditions in order: (1) to enable polyp bacteria in its mixed liquor: (a) to multiply by utilizing the polymerized substrate of organic compounds stored intracellularly and (b) to ingest phosphate ions on a "luxury" uptake basis; and (2) to nitrify ammonia which has been created by deamination of proteins contained in the inflowing wastewater stream to the first-stage reactor.

BRIEF DESCRIPTION OF THE DRAWINGS

FIG. 3 is a graph showing the nitrate removal efficiencies, as percentages based on incoming nitrogen, for Anoxic Reactors No. 1 in the MLE Process and B in the Bio-P Process versus mixed liquor recycle rates as four multiples of the incoming wastewater rate, Q, while holding constant four multiples of the Return Activated Sludge to the Anoxic Reactors No. 1 and B. FIG. 3 also shows a single curve for the nitrate removal efficiencies versus mixed liquor recycle rates, as multiples of Q, for Aerobic Nitrification Reactors No. 2 and C, without return of activated sludge from the Clarifier.

DETAILED DESCRIPTION OF THE
PREFERRED EMBODIMENTS

The MLE Process

Dual-suction capabilities for the jet recirculation pump are additionally preferred so that Reactor No. 1 can maintain operation even if Reactor No. 2 must be shut down, provided that a supplemental source of oxygen is made available for removing carbonaceous BOD by biological synthesis. Specifically, if Reactor No. 2 must be taken out of service, the total suction flow required by the jet recirculation pump for Reactor No. 1 is drawn entirely from Reactor No. 1 rather than a portion or all of the suction flow being drawn from Reactor No. 2.

This dual use of the jet recirculation pump for Reactor No. 1 can thereby be used to provide a high nitrate recycle pumping rate from Reactor No. 2 back to Reactor No. 1, thereby eliminating the need to install and operate a separate nitrate recycle pump for transferring mixed liquor from Reactor No. 2 back to Reactor No. 1. Without this dual-use system, the jet recirculation pump sizing for a separate pump, which would be required to provide complete mixing of Reactor No. 1, would typically be greater than 600% of the throughput wastewater flow rate in the treatment system. However, this dual-use system permits 100% of the jet recirculation pump flow suction to be taken from Reactor No. 2 and pumped back to Reactor No. 1 through its jet mixing manifold so that a nitrate recycle rate of over 800% can be provided. This dual-use system results in a nitrate removal efficiency of over 85% without consuming additional energy for operating a separate nitrate recycle pump or pumps.

In the MLE two-stage activated sludge treatment process, activated sludge return flow can also be pumped from the final Clarifier back to Reactor No. 1 or to Reactor No. 2. If sludge return flow is recycled back to Reactor No. 1, then additional nitrate ions are necessarily contained in this sludge return flow, resulting in higher denitrification efficiency being achieved in Reactor No. 1. For example, if a nitrate recycle rate equal to 500% is utilized and if sludge is also returned from the Clarifier back to Reactor No. 1, the MLE process can achieve a nitrate nitrogen removal efficiency of over 80%. Without using sludge return, attaining a nitrate nitrogen removal efficiency of over 85% requires the use of excessively large nitrate recycle pumps rated to provide a total recycle flow rate equal to 600%, resulting in greater operating costs for pumping power and greater capital costs for larger pumps and piping.

Figure 1:
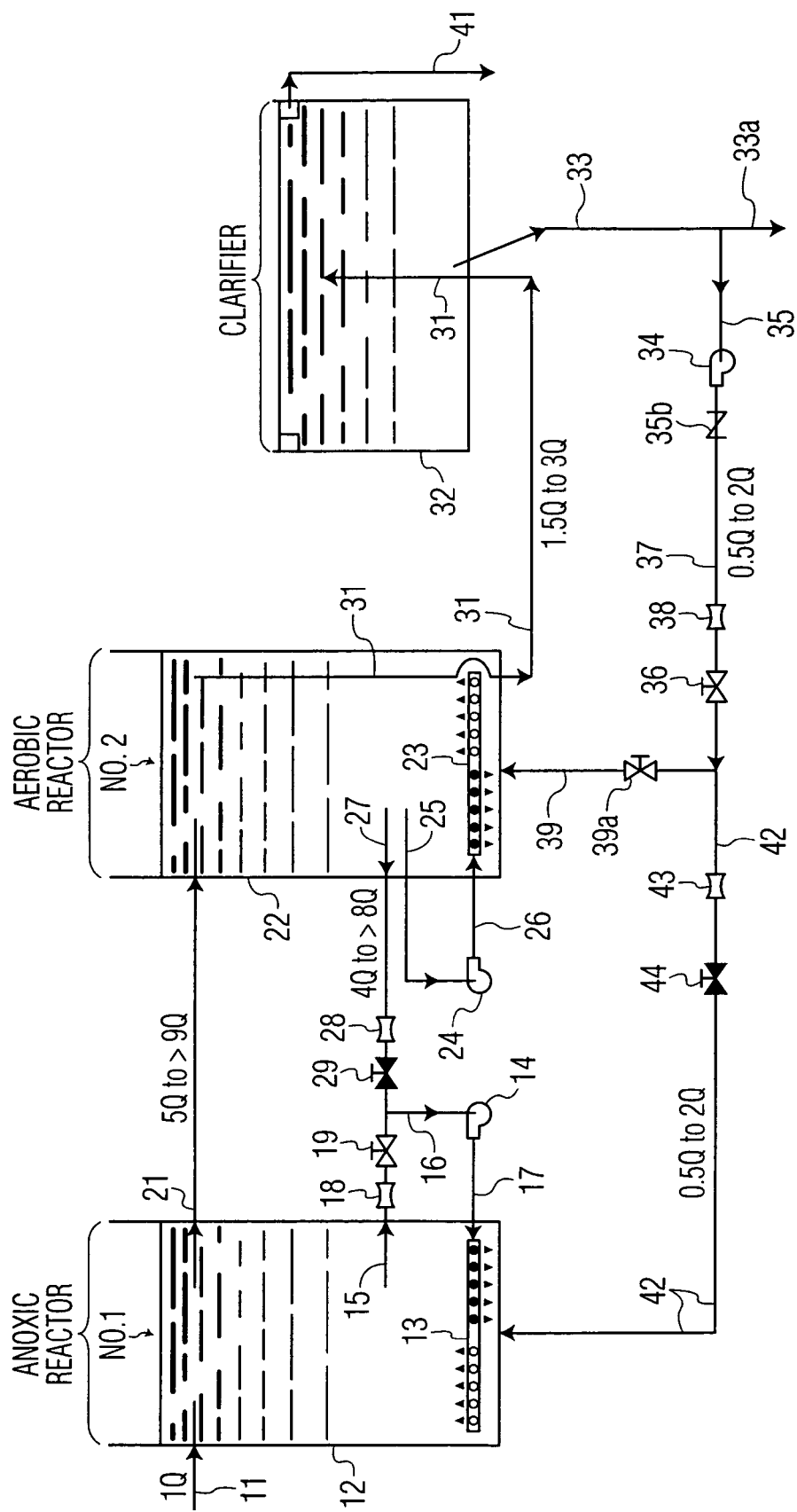
FIG. 1 is a process flow diagram of a wastewater treatment plant, utilizing the MLE process, that comprises two reactors and a clarifier.

As shown in FIG. 1, wastewater input flow 11 is at rate Q into the first-stage Anoxic Reactor No. 1 within deep tank 12. This tank 12 is mixed by jet manifold 13 that is fed by dual-use jet recirculation pump 14 through lines 15, 16, and 17 as mixing output from tank 12 back into tank 12, in order to provide recirculation and mixing. The recirculation flow can be controlled by shut-off valve 19 and flow meter 18. Pump 14 can also withdraw nitrate-rich mixed liquor from Reactor No. 2 at rates of 4Q to more than 8 Q. Discharge output from tank 12 into deep tank 22, containing second-stage Aerobic Nitrification Reactor No. 2, is through line 21. The discharge rate through line 21 is at 5Q to over 9Q.

Reactor No. 2 is recirculated and mixed by jet manifold 23 that is fed by pump 24 through lines 25 and 26 as mixing output from Reactor No. 2 back into Reactor No. 2. Recycle output from Reactor No. 2 is selectively through line 27, flow meter 28, control valve 29, and line 16 to dual-use jet recirculation pump 14. The flow rate in line 27 is 4Q to more than 8Q. Discharge output is through line 31 into Clarifier 32. The discharge rate in line 31 is 1.5Q to 3Q.

Clarified liquor leaves Clarifier 32 through line 41. Activated sludge leaves Clarifier 32 as waste sludge through lines 33 and 33a or as return sludge through lines 33 and 35 through pump 34, flow meter 38, and control valve 36, into the bottom of Reactor No. 2 in deep tank 22 through line 39 and control valve 39a. Alternatively and selectively, the return sludge may pass partially or completely through line 42, flow meter 43, and control valve 44 into the bottom of Reactor No. 1 in deep tank 12. The flow rate of return sludge through lines 39 and/or 42, as measured by flow meters 38 and/or 43, is 0.5Q to 2Q. The sum of the flows in lines 33 and 41 must be equal to 1Q on a long-term basis (ignoring the small amount of waste sludge exiting the process through line 33a).

Including flow meter 28 in suction line 27 is preferred so that the suction flow rate pumped from Reactor No. 2 can be metered as a nitrate recycle flow back to Reactor No. 1. Dual-suction capabilities for jet recirculation pump 14, to provide mixing in Reactor No. 1, is also preferred so that Reactor No. 1 can maintain operation even if Reactor No. 2 must be shut down. For example, if Reactor No. 2 must be taken out of service, then the total suction flow used for jet recirculation pump 14 to feed Reactor No. 1 in deep tank 12 will be drawn from Reactor No. 1 rather than a portion or all of the suction flow being drawn from Reactor No. 2. Control valves 19 and 29 are useful during this operation.

This dual use of jet recirculation pump 14 for Reactor No. 1 can provide a high nitrate recycle pumping rate from Reactor No. 2 back to Reactor No. 1, thereby eliminating the need to install and operate a separate nitrate recycle pump for pumping from Reactor No. 2 back to Reactor No. 1. The dual-use jet pump design of this invention also provides a means whereby a much higher nitrate recycle flow rate can be achieved from Reactor No. 2 back to Reactor No. 1 without installation of a large nitrate recycle pump.

The jet recirculation pump sizing required to provide complete mixing within Reactor No. 1 is typically greater than 600% of the throughput wastewater flow rate in the treatment system through line 11. Consequently, if nearly all of the suction flow through lines 27 and 16 to jet recirculation pump 14 is taken from Reactor No. 2 and pumped back to Reactor No. 1 through line 17 and jet mixing manifold 13, then a nitrate recycle rate of over 600% is provided, resulting in a nitrate nitrogen removal efficiency of over 85% without consuming additional energy for operation of a separate nitrate recycle pump or pumps. As indicated in FIG. 1, the flow rate through line 27 and flow meter 28 is 4Q to more than 8Q, thereby selectively exceeding the flow rate required for complete mixing in Reactor No. 1 and also easily obtaining a nitrate nitrogen removal efficiency of well over 85%.

EXAMPLE 1

Using the MLE Process, five stages of nitrate removal efficiencies, as percentages, are obtained for Aerobic Reactor No. 2 in FIG. 1 by listing five incremental inflows of nitrate-poor mixed liquor from Anoxic Reactor No. 1 through line 21 to Aerobic Reactor No. 2 and five incremental outflows of nitrate-rich mixed liquor through line 27, as a recycling stream from Aerobic Reactor No. 2 to Anoxic Reactor No. 1, while holding constant the outflow through line 31 to the Clarifier during four incremental stages, as shown in the following Table I. All sludge is being returned to Aerobic Reactor No. 2 through line 39.

TABLE I

| Flows | Flow Amounts, Q | | | | | $NO_3^-$ Removal Efficiency, % | | | | |
|---|---|---|---|---|---|---|---|---|---|---|
| Inflow, line 11 | 1 | 1 | 1 | 1 | 1 | | | | | |
| Inflow, line 21 | 5 | 6 | 7 | 8 | 9 | | | | | |
| Outflow, line 27 | 4 | 5 | 6 | 7 | 8 | 80.0 | 83.3 | 85.7 | 87.5 | 88.9 |
| Outflow, line 31 | 1.5 | 1.5 | 1.5 | 1.5 | 1.5 | | | | | |
| Inflow, line 11 | 1 | 1 | 1 | 1 | 1 | | | | | |
| Inflow, line 21 | 5 | 6 | 7 | 8 | 9 | | | | | |
| Outflow, line 27 | 4 | 5 | 6 | 7 | 8 | 80.0 | 83.3 | 85.7 | 87.5 | 88.9 |
| Outflow, line 31 | 2 | 2 | 2 | 2 | 2 | | | | | |
| Inflow, line 11 | 1 | 1 | 1 | 1 | 1 | | | | | |
| Inflow, line 21 | 5 | 6 | 7 | 8 | 9 | | | | | |
| Outflow, line 27 | 4 | 5 | 6 | 7 | 8 | 80.0 | 83.3 | 85.7 | 87.5 | 88.9 |

TABLE I-continued

| Flows | Flow Amounts, Q | | | | | NO$_3^-$ Removal Efficiency, % | | | | |
|---|---|---|---|---|---|---|---|---|---|---|
| Outflow, line 31 | 2.5 | 2.5 | 2.5 | 2.5 | 2.5 | | | | | |
| Inflow, line 11 | 1 | 1 | 1 | 1 | 1 | | | | | |
| Inflow, line 21 | 5 | 6 | 7 | 8 | 9 | | | | | |
| Outflow, line 27 | 4 | 5 | 6 | 7 | 8 | 80.0 | 83.3 | 85.7 | 87.5 | 88.9 |
| Inflow, line 31 | 3 | 3 | 3 | 3 | 3 | | | | | |

Using the MLE Process, five stages of nitrate removal efficiencies, as percentages, are obtained for Anoxic Reactor No. 1 in FIG. 1 by listing five incremental inflows of nitrate-rich mixed liquor through lines 27, 16, and 17, as a recycling stream from Reactor No. 2 to Reactor No. 1 while holding constant the sludge return inflow through line 42 to Anoxic Reactor No. 1 during four incremental stages to Anoxic Reactor No. 1, as shown in the following Table II. All sludge is being returned to Anoxic Reactor No. 1 through line 42.

TABLE II

| Flow Paths | Flow Amounts, Q | | | | | NO$_3^-$ Removal Efficiency, % | | | | |
|---|---|---|---|---|---|---|---|---|---|---|
| Inflow, line 11 | 1 | 1 | 1 | 1 | 1 | | | | | |
| Inflow, line 27 | 4 | 5 | 6 | 7 | 8 | 81.8 | 84.6 | 86.7 | 88.2 | 89.5 |
| Inflow, line 42 | 0.5 | 0.5 | 0.5 | 0.5 | 0.5 | | | | | |
| Inflow, line 11 | 1 | 1 | 1 | 1 | 1 | | | | | |
| Inflow, line 27 | 4 | 5 | 6 | 7 | 8 | 83.3 | 85.7 | 87.5 | 88.9 | 90.0 |
| Inflow, line 42 | 1 | 1 | 1 | 1 | 1 | | | | | |
| Inflow, line 11 | 1 | 1 | 1 | 1 | 1 | | | | | |
| Inflow, line 27 | 4 | 5 | 6 | 7 | 8 | 84.6 | 86.7 | 88.2 | 89.5 | 90.5 |
| Inflow, line 42 | 1.5 | 1.5 | 1.5 | 1.5 | 1.5 | | | | | |
| Inflow, line 11 | 1 | 1 | 1 | 1 | 1 | | | | | |
| Inflow, line 27 | 4 | 5 | 6 | 7 | 8 | 85.7 | 87.5 | 88.9 | 90.0 | 90.9 |
| Inflow, line 42 | 2 | 2 | 2 | 2 | 2 | | | | | |

The Bio-P Process

Figure 2:
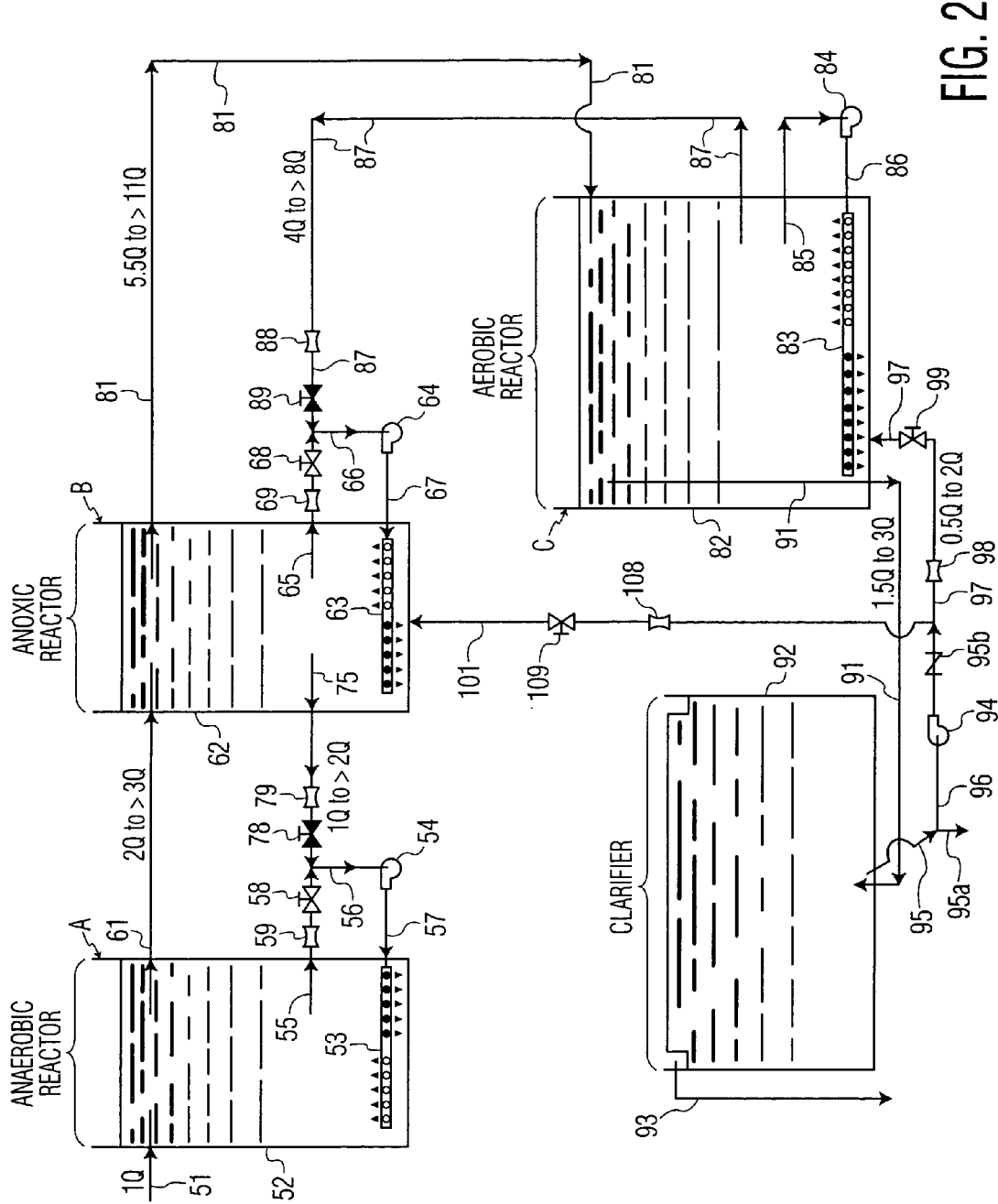
FIG. 2 is a process flow diagram of a Bio-P wastewater treatment plant comprising three reactors and a clarifier.

As shown in FIG. 2, Reactors A, B, and C operate in deep tanks 52, 62, and 82, respectively. Wastewater input flow 51 into deep tank 52 is at rate Q. This tank is mixed by jet manifold 53 that is fed by jet recirculation pump 54 through lines 55, 56, and 57, thereby providing both recirculation and mixing. Pump 54 also has a dual use when it withdraws nitrate-poor mixed liquor from tank 62, at a controlled rate of 1Q to more than 2Q through line 75, and feeds this liquor through line 57 to jet manifold 53.

Control valve 58 enables output from Reactor A within tank 52 to be selectively controlled according to flow meter 59. Control valve 78 enables output from Reactor B within tank 62 to be selectively controlled according to flow meter 79. Discharge output from first-stage Anaerobic Reactor A is through line 61 into deep tank 62 containing second-stage Anoxic Reactor B. The flow rate through line 61 is 2Q to over 3Q.

Tank 62 is recirculated and mixed by jet manifold 63 that is fed by dual-use jet recirculation pump 64 through lines 65, 66, and 67. Pump 64 has a dual use when it withdraws nitrate-rich mixed liquor from tank 82 through line 87 and feeds it to jet manifold 63 through line 67 as recycle liquor at flow rates from 4Q to more than 8Q.

Control valve 68 enables output from tank 62 to be selectively controlled according to flow meter 69. Control valve 89 enables input from tank 82 to be selectively controlled according to flow meter 89. Discharge output from Reactor B is through line 81 to deep tank 82, containing third-stage Reactor C. The discharge flow rate to tank 82 is 5.5Q to over 11Q.

Reactor C is mixed by jet manifold 83 that is fed by pump 84 through line 85 and then line 86. Discharge output from Reactor C is through line 91 to final-stage Clarifier 92. The transfer output is 1.5Q to 3Q.

Clarified liquor leaves Clarifier 92 through line 93. Activated sludge leaves Clarifier 92 as waste sludge through lines 95 and 95a or as return activated sludge through lines 95 and 96, sludge pump 94, line 97, check valve 95b, flow meter 98, and control valve 99 to Reactor C. The flow rate of return sludge through lines 95 and 97, as measured by flow meter 98, is 0.5Q to 2Q.

Alternatively, return sludge can be sent partially or entirely to Reactor B through line 101, flow meter 108, and control valve 109 at the same flow rate of 0.5Q to 2Q.

In this three-stage Bio-P process, the anoxic recycle rate from Reactor B back to Reactor A and the nitrate recycle rate from Reactor C back to Reactor B can be achieved by employing dual-use jet recirculation pumps 54 and 64, as previously described for the two-stage MLE process. In this three-stage process, however, the suction flow from the second-stage Anoxic Reactor B is pumped back to the first-stage Anaerobic Reactor A and is controlled and metered to provide the desired anoxic recycle rate from Reactor B back to Reactor A. Any additional recirculation flow that is required to provide complete mixing in Anaerobic Reactor A can be provided by the second suction lines 55 and 56 to jet recirculation pump 54.

Similarly, dual-use jet recirculation pump 64, which provides complete mixing in Anoxic Reactor B, can be operated to distribute suction flow from third-stage Aerobic Nitrification Reactor C as a nitrate recycle flow through lines 87, 66, and 67 or as internal recycle flow from the second-stage Anoxic Reactor B through line 65, flow meter 69, control valve 68, and lines 66 and 67 to jet manifold 63.

EXAMPLE 2

Using the Bio-P Process, five stages of nitrate removal efficiencies, as percentages, are obtained for Aerobic Nitrification Reactor C in FIG. 2 by listing five incremental inflows of nitrate-poor mixed liquor from Anoxic Reactor B through line 81 to Aerobic Reactor C and five incremental outflows of nitrate-rich mixed liquor from Aerobic Reactor C through line 87 to Anoxic Reactor B, while holding constant the outflows from Aerobic Reactor C through line 91 to the Clarifier during four incremental stages, as shown in the following Table III. ALL sludge is being returned to Aerobic Reactor C through line 97.

TABLE III

| Flow Paths | Flow Amounts, Q | | | | | NO$_3^-$ Removal Efficiency, % | | | | |
|---|---|---|---|---|---|---|---|---|---|---|
| Inflow, line 51 | 1 | 1 | 1 | 1 | 1 | | | | | |
| Inflow, line 81 | 5 | 6 | 7 | 8 | 9 | | | | | |
| Outflow, line 87 | 4 | 5 | 6 | 7 | 8 | 80.0 | 83.3 | 85.7 | 87.5 | 88.9 |
| Outflow, line 91 | 1.5 | 1.5 | 1.5 | 1.5 | 1.5 | | | | | |
| Inflow, line 51 | 1 | 1 | 1 | 1 | 1 | | | | | |
| Inflow, line 81 | 5 | 6 | 7 | 8 | 9 | | | | | |
| Outflow, line 87 | 4 | 5 | 6 | 7 | 8 | 80.0 | 83.3 | 85.7 | 87.5 | 88.9 |
| Outflow, line 91 | 2 | 2 | 2 | 2 | 2 | | | | | |
| Inflow, line 51 | 1 | 1 | 1 | 1 | 1 | | | | | |
| Inflow, line 81 | 5 | 6 | 7 | 8 | 9 | | | | | |
| Outflow, line 87 | 4 | 5 | 6 | 7 | 8 | 80.0 | 83.3 | 85.7 | 87.5 | 88.9 |
| Outflow, line 91 | 2.5 | 2.5 | 2.5 | 2.5 | 2.5 | | | | | |
| Inflow, line 51 | 1 | 1 | 1 | 1 | 1 | | | | | |
| Inflow, line 81 | 5 | 6 | 7 | 8 | 9 | | | | | |
| Outflow, line 87 | 4 | 5 | 6 | 7 | 8 | 80.0 | 83.3 | 85.7 | 87.5 | 88.9 |
| Outflow, line 91 | 3.0 | 3.0 | 3.0 | 3.0 | 3.0 | | | | | |

Using the Bio-P Process, five stages of nitrate removal efficiencies, as percentages, are obtained for Anoxic Reactor B in FIG. 2 by listing five incremental inflows of nitrate-rich mixed liquor from Aerobic Reactor C through line 87 to Anoxic Reactor B and five incremental outflows of nitrate-poor mixed liquor from Anoxic Reactor B through line 81 to Aerobic Reactor C, while holding constant the sludge return inflow through line 101 to Anoxic Reactor B during four incremental stages that equally affect the outflow through line 81, as shown in the following Table IV. All sludge is being returned to Anoxic Reactor B through line 101.

TABLE IV

| Flow Paths | Flow Amounts, Q | | | | | NO$_3^-$ Removal Efficiency, % | | | | |
|---|---|---|---|---|---|---|---|---|---|---|
| Inflow, line 51 | 1 | 1 | 1 | 1 | 1 | | | | | |
| Inflow, line 87 | 4 | 5 | 6 | 7 | 8 | 81.8 | 84.6 | 86.7 | 88.2 | 89.5 |
| Inflow, line 101 | 0.5 | 0.5 | 0.5 | 0.5 | 0.5 | | | | | |
| Outflow, line 81 | 5.5 | 6.5 | 7.5 | 8.5 | 9.5 | | | | | |
| Inflow, line 51 | 1 | 1 | 1 | 1 | 1 | | | | | |
| Inflow, line 87 | 4 | 5 | 6 | 7 | 8 | 83.3 | 85.7 | 87.5 | 88.9 | 90.0 |
| Inflow, line 101 | 1 | 1 | 1 | 1 | 1 | | | | | |
| Outflow, line 81 | 6 | 7 | 8 | 9 | 10 | | | | | |
| Inflow, line 51 | 1 | 1 | 1 | 1 | 1 | | | | | |
| Inflow, line 87 | 4 | 5 | 6 | 7 | 8 | 84.6 | 86.7 | 88.2 | 89.5 | 90.5 |
| Inflow, line 101 | 1.5 | 1.5 | 1.5 | 1.5 | 1.5 | | | | | |
| Outflow, line 81 | 6.5 | 7.5 | 8.5 | 9.5 | 10.5 | | | | | |
| Inflow, line 51 | 1 | 1 | 1 | 1 | 1 | | | | | |
| Inflow, line 87 | 4 | 5 | 6 | 7 | 8 | 85.7 | 87.5 | 88.9 | 90.0 | 90.9 |
| Inflow, line 101 | 2.0 | 2.0 | 2.0 | 2.0 | 2.0 | | | | | |
| Outflow, line 81 | 7 | 8 | 9 | 10 | 11 | | | | | |

Curves A, B, C, and D in FIG. 3 show the nitrate removal efficiencies obtainable in Anoxic Reactors No. 1 and B at five quantities of mixed liquor recycle in terms of Q for four quantities of return activated sludge recycle through lines 42 and 101 to respective tanks 22 and 62. Efficiencies ranging from 82 percent to 91 percent can be obtained thereby, depending upon the activated sludge return rate.

FIG. 3 has an additional curve E for the nitrate removal efficiencies obtainable in Aerobic Nitrification Reactors No. 2 and C over the same range of mixed liquor recycle rates, with all activated sludge being returned through lines 39 and 97, respectively. Efficiencies ranging from 80% to 89 percent can be obtained thereby.

Because it will be readily apparent to those skilled in the wastewater treatment art that innumerable variations, modifications, applications, and extensions of the principles of this invention as hereinbefore set forth can be made without departing from the spirit and scope of the invention, what is herein defined as such scope and is desired to be protected should be measured, and the invention should be limited, only by the following claims.

What is claimed is:

1. A wastewater treatment process for deep tanks operated in a series that comprises an initial tank containing mixed liquor which receives a stream of throughput wastewater flowing at an input rate and a downstream tank which discharges into a clarifier, comprising the dual use of a jet recirculation pump, which is flow connected to said initial tank and to said downstream tank, to provide selectively both:
   A) backward recycling, with said dual-use jet recirculation pump, of at least 100% of said input rate from said downstream tank to a jet manifold, disposed within said initial tank, that mixes the contents of said initial tank; and
   B) pumping said mixed liquor from said initial tank to said jet manifold with said dual-use jet recirculation pump, whereby higher operating costs for electric power and higher capital costs for larger pumps and piping are avoided.

2. The process of claim 1, wherein:
A) said initial tank is operated as an Anoxic Reactor and said downstream tank is operated as a Aerobic Reactor; and
B) said process is a two-stage activated sludge process, conventionally termed a Modified Ludzak Ettenger Process, for:
   1) fermenting proteins in said wastewater to liberate ammonia and removing carbonaceous Biological Oxygen Demand by biological synthesis while said wastewater is within said Anoxic Reactor,
   2) oxidizing said ammonia to form nitrate ions while said wastewater is within said Aerobic Reactor, and
   3) reducing said nitrate ions to form nitrogen gas while said wastewater is within said Anoxic Reactor, whereby substantial denitrification of said throughput wastewater occurs.

3. The process of claim 2, wherein:
A) said backward recycling from said Aerobic Reactor to said Anoxic Reactor is 4 to more than 8 times said input rate;
and B) said mixed liquor discharges from said Anoxic Reactor to said Aerobic Reactor, said discharging being from 5 to more than 9 times said input rate.

4. The process of claim 3, wherein:
A) said mixed liquor discharges from said Aerobic Reactor to said clarifier at from 1.5 to 3 times said input rate; and
B) said clarifier discharges clarified liquor and sludge, a portion of said sludge being recycled to said Aerobic Reactor at 0.5 to 2 times said input rate.

5. The process of claim 3, wherein:
A) said mixed liquor discharges from said Aerobic Reactor to said clarifier at from 1.5 to 3 times said input rate; and
B) said clarifier discharges clarified liquor and sludge, a portion of said sludge being recycled to said Anoxic Reactor at 0.5 to 2 times said input rate.

6. The process of claim 5, wherein a nitrate-rich recycle flow rate from said Aerobic Reactor to said Anoxic Reactor equal to 400 percent to 800 percent of said input rate is utilized in combination with said return of activated sludge from said clarifier to said Anoxic Reactor, resulting in a nitrate removal efficiency of 82 to 91 percent without consuming additional energy for operation of a separate nitrate recycle pump or pumps.

7. The process of claim 1, wherein:
A) said initial tank is operated as an Anaerobic Reactor, said downstream tank is operated as an Anoxic Reactor, and a final tank, disposed downstream of said Anoxic Reactor, is operated as an Aerobic Reactor;
B) said process is a three-stage activated sludge process for treating wastewater, conventionally termed a Biological Phosphorus Process;
C) said Anaerobic Reactor has a jet manifold, disposed at its bottom for mixing the contents thereof, and a dual-use jet recirculation pump which is flow connected to said Anaerobic Reactor for withdrawing selected amounts of mixed liquor therefrom and is also flow connected to said Anoxic Reactor for withdrawing selected amounts of mixed liquor therefrom and is additionally flow connected to said jet manifold within said Anaerobic Reactor for feeding said withdrawn mixed liquors thereto;
D) said Anoxic Reactor has a jet manifold, disposed at its bottom for mixing the contents thereof, and a dual-use jet recirculation pump which is flow connected to said Anoxic Reactor for withdrawing selected amounts of mixed liquor therefrom and is also flow connected to said Aerobic Reactor for withdrawing selected amounts of mixed liquor therefrom and is additionally flow connected to said jet manifold within said Anoxic Reactor for feeding said withdrawn mixed liquors thereto; and
E) said Aerobic Reactor has a jet manifold, disposed at its bottom for mixing the contents thereof, and a recirculation pump which is flow connected to said Aerobic Reactor for withdrawing selected amounts of mixed liquor therefrom and is also flow connected to said jet manifold within said Aerobic Reactor for feeding said withdrawn mixed liquor thereto.

8. The process of claim 7, wherein:
A) said withdrawing of nitrate-poor mixed liquor from said Anoxic Reactor to said Anaerobic Reactor by said dual-use jet recirculation pump is from one to more than two times said input rate, enabling phosphorus-storing (polyp) bacteria in said Anaerobic Reactor to hydrolyze adenosine triphosphate and release energy that is utilized to polymerize Volatile Fatty Acids present in said wastewater and additional Volatile Fatty Acids liberated by fermentation of proteins to form a substrate of organic compounds that are stored intracellularly by said polyP bacteria;
B) said mixed liquor discharges from said Anaerobic Reactor to said Anoxic Reactor at 2 to more than 3 times said input rate;
C) said withdrawing of nitrate-rich mixed liquor from said Aerobic Reactor to said Anoxic Reactor by said dual-use jet recirculation pump is from 4 to more than 8 times said input rate;
D) ammonia having also been liberated from said proteins by fermentation in said Anaerobic Reactor and in said Anoxic Reactor by the activities of several species of microorganisms, said mixed liquor discharges from said Anoxic Reactor to said Aerobic Reactor at 5.5 to more than 11 times said input rate, whereby said ammonia is then oxidized to nitrate ions in said Aerobic Reactor and said ions are finally denitrified in said Anoxic Reactor to form nitrogen gas;
E) said mixed liquor discharges from said Aerobic Reactor to a clarifier at 1.5 to 3 times said input rate, enabling said polyp bacteria to:
   1) proliferate while in said Aerobic Reactor,
   2) metabolize said stored intracellular compounds for growth and energy, and
   3) remove large quantities of phosphate from solution with excess energy during a "luxury" uptake stage;
F) said clarifier discharges sludge, a portion of said sludge being withdrawn by a flow-connected pump and fed to said Anoxic Reactor and/or to said Aerobic Reactor at a rate of from 0.5 to 2 times said input rate, and the remaining portion of said sludge being wasted, whereby:
   1) large quantities of phosphorus are removed from said process in said wasted portion of said sludge, and
   2) a stream of clarified liquor discharged by said clarifier contains substantially smaller quantities of both nitrogen and phosphorus as compared to said stream of throughput wastewater.

9. In a process for treating a stream of wastewater being fed at an input rate to an initial deep tank of a series of deep tanks, the improvement comprising the employment of at least one dual-use jet recirculation pump, comprising:

A) withdrawing a selected amount of mixed liquor from at least said initial deep tank with said dual-use jet recirculation pump and feeding said withdrawn mixed liquor to a jet mixing manifold, disposed within said initial deep tank, for mixing the contents thereof; and B) withdrawing a selected amount of downstream mixed liquor from a downstream deep tank of said series of deep tanks with said dual-use jet recirculation pump and feeding said downstream mixed liquor to said jet mixing manifold.

10. The process of claim 9, wherein:

A) the rate of withdrawing said mixed liquor from said downstream tank is from 4 to more than 8 times said input rate; and B) the rate of discharge of said mixed liquor from said initial deep tank to said downstream deep tank is from 5 to more than 9 times said input rate.

11. The process of claim 10, wherein:

A) said downstream deep tank discharges to a clarifier at a rate of 1.5 to 3 times said input rate; and B) a pump withdraws return sludge from said clarifier at a rate of 0.5 to 2 times said input rate and feeds a selected portion of said return sludge to said downstream deep tank and/or said initial deep tank, whereby ammonia formed by fermentation of proteins in said inflowing wastewater is oxidized to form nitrate ions while in said downstream tank and said nitrate ions are substantially reduced to form nitrogen gas while in said initial deep tank.

12. The process of claim 9, wherein:

A) said series of deep tanks comprises said initial tank, said downstream tank, and a final tank;

B) said initial tank functions as an Anaerobic Reactor, said downstream tank functions as an Anoxic Reactor, and said final tank functions as an Aerobic Reactor; and C) said Anaerobic Reactor has a jet manifold, disposed at its bottom for mixing the contents thereof, and a dual-use jet recirculation pump which is flow connected to said Anaerobic Reactor for withdrawing selected amounts of mixed liquor therefrom and is also flow connected to said Anoxic Reactor for withdrawing selected amounts of nitrate-poor mixed liquor therefrom and is additionally flow connected to said jet manifold within said Anaerobic Reactor for feeding said withdrawn mixed liquors thereto;

D) said Anoxic Reactor has a jet manifold, disposed at its bottom for mixing the contents thereof, and a dual-use jet recirculation pump which is flow connected to said Anoxic Reactor for withdrawing selected amounts of mixed liquor therefrom and is also flow connected to said Aerobic Reactor for withdrawing selected amounts of mixed liquor therefrom and is additionally flow connected to said jet manifold within said Anoxic Reactor for feeding said withdrawn mixed liquors thereto; and E) said Aerobic Reactor has a jet manifold, disposed at its bottom for mixing the contents thereof, and a recirculation pump which is flow connected to said Aerobic Reactor for withdrawing selected amounts of mixed liquor therefrom and is also flow connected to said jet manifold within said Aerobic Reactor for feeding said withdrawn mixed liquor thereto.

13. The process of claim 12, wherein:

A) said withdrawing of mixed liquor from said Anoxic Reactor by said dual-use jet recirculation pump is from one to more than 2 times said input rate;

B) said mixed liquor discharges from said Anaerobic Reactor to said Anoxic Reactor at 2 to more than 3 times said input rate;

C) said withdrawing of mixed liquor from said Aerobic Reactor to said Anoxic Reactor by said dual-use jet recirculation pump is from 4 to more than 8 times said input rate; and D) said mixed liquor discharges from said Anoxic Reactor to said Aerobic Reactor at 5.5 to more than 11 times said input rate, said Aerobic Reactor being mixed by a jet manifold disposed therein which is fed by a recirculation pump.

14. The process of claim 13, wherein:

A) said Aerobic Reactor discharges to a clarifier at a rate of 2.5 to 3 times said input rate; and B) a pump withdraws return sludge from said clarifier and selectively feeds a portion of said return sludge to said Aerobic Reactor and/or to said Anoxic Reactor, said portion being 0.5 to 2 times said input rate, and discharges the remaining portion as waste sludge, whereby a stream of clarified liquor discharged by said clarifier contains substantially smaller quantities of both nitrogen and phosphorus as compared to said stream of throughput wastewater and large quantities of phosphorus are removed from the process in said waste sludge.

15. A continuous process for treating a stream of wastewater flowing at an input rate and containing proteins and a soluble substrate comprising soluble carbonaceous Chemical Oxygen Demand (COD) and Biological Oxygen Demand (BOD), wherein said process comprises the following steps:

A) fermenting said proteins in said stream to form Volatile Fatty Acids and ammonia, oxidizing said ammonia to form nitrate ions, and reducing up to 91 percent of said nitrate ions to liberate nitrogen gas;

B) hydrolysing adenosine triphosphate (ATP) by phosphorus-storing (polyp) bacteria to release phosphate and 7.3 kcal/mol of energy per mol of ATP;

C) utilizing said released energy to polymerize a substrate of organic compounds, including said Volatile Fatty Acids as well as additional Volatile Fatty Acids and short-chain alcohols in said input wastewater, for intracellular storage as polymerized compounds;

D) metabolizing said stored intracellular compounds for proliferating said polyp bacteria and for releasing energy; and E) removing phosphate from solution and storing excess energy in intracellular phosphate bonds during a "luxury" uptake stage, whereby said polyp bacteria may comprise up to 10 percent by weight of phosphorus, wherein all of said steps occur within an Anaerobic Reactor, an Anoxic Reactor, and an Aerobic Reactor which are disposed in a downstream series, each said reactor having a jet manifold disposed at the bottom thereof for mixing the contents thereof and an attached jet recirculation pump which is flow connected to said jet manifold, said jet recirculation pumps attached to said Anaerobic Reactor and to said Anoxic Reactor being dual-use pumps which are additionally flow connected to a downstream reactor.

16. The process of claim 15, wherein said Aerobic Reactor discharges, at a rate of 1.5 to 3 times said input rate, to a clarifier which produces clarified liquor and sludge.

17. The process of claim 16, wherein:
A) said withdrawing of mixed liquor from said Anoxic Reactor by said dual-use jet recirculation pump is from one to more than 2 times said input rate;
B) said mixed liquor discharges from said Anaerobic Reactor to said Anoxic Reactor at 2 to more than 3 times said input rate;
C) said withdrawing of mixed liquor from said Aerobic Reactor to said Anoxic Reactor by said dual-use jet recirculation pump is from 4 to more than 8 times said input rate; and
D) said mixed liquor discharges from said Anoxic Reactor to said Aerobic Reactor at 5.5 to more than 11 times said input rate, said Aerobic Reactor being mixed by a third jet manifold.

18. The process of claim 17, wherein said clarifier discharges sludge, and a portion of said sludge is withdrawn by a flow-connected pump and fed to said Anoxic Reactor and/or to said Aerobic Reactor at a rate of from 0.5 to 2 times said input rate, thereby supplying nitrate ions to said reactors whereby said nitrate ions are substantially reduced to form nitrogen gas, causing a stream of clarified liquor discharged by said clarifier to contain substantially smaller quantities of nitrogen as compared to said stream of throughput wastewater.

19. The process of claim 18, wherein a nitrate recycle rate equalling 400 percent to 800 percent of said input rate is utilized in combination with a return rate of activated sludge from said clarifier to said Anoxic Reactor equalling 0.5 to 2 times said input rate, to produce a nitrate removal efficiency of 82 to 91 percent.

20. The process of claim 17, wherein said Aerobic Reactor is maintained under aerobic conditions in order to:
A) enable polyp bacteria in its mixed liquor to:
1) multiply by utilizing a polymerized substrate of organic compounds stored intracellularly while releasing energy, and
2) ingest phosphate ions on a "luxury" uptake basis; and
B) oxidize ammonia, which is created by deamination of proteins contained in said inflowing wastewater stream to said Anaerobic Reactor, to form nitrate ions.

* * * * *